(12) United States Patent
Ito

(10) Patent No.: US 7,505,199 B2
(45) Date of Patent: Mar. 17, 2009

(54) MICROSCOPE LENS BARREL

(75) Inventor: Madoka Ito, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/025,110

(22) Filed: Feb. 4, 2008

(65) Prior Publication Data

US 2008/0186596 A1 Aug. 7, 2008

(30) Foreign Application Priority Data

Feb. 6, 2007 (JP) ............................. 2007-026755

(51) Int. Cl.
*G02B 21/00* (2006.01)
*G02B 21/18* (2006.01)

(52) U.S. Cl. .................. 359/368; 359/374; 359/372; 359/381; 359/385; 359/383; 359/363; 359/618

(58) Field of Classification Search ................ 359/811, 359/819, 813, 823, 618, 363, 368, 372, 374, 359/379, 381, 383, 385, 387, 388, 390, 391, 359/393, 394, 727; 362/551, 554, 575; 250/201.2, 250/201.4, 442.11

See application file for complete search history.

(56) References Cited

U.S. PATENT DOCUMENTS

| | | | | |
|---|---|---|---|---|
| 4,639,098 | A | * | 1/1987 | Aoyama et al. ............. 359/381 |
| 5,138,486 | A | * | 8/1992 | Meyer et al. ................ 359/363 |
| 5,235,459 | A | * | 8/1993 | Meyer et al. ................ 359/372 |
| 6,097,538 | A | | 8/2000 | Watanabe et al. |
| 6,219,180 | B1 | | 4/2001 | Hasegawa et al. |
| 7,180,689 | B2 | * | 2/2007 | Shinada ...................... 359/826 |
| 2002/0171925 | A1 | | 11/2002 | Tonooka et al. |
| 2005/0088731 | A1 | | 4/2005 | Shinada |
| 2006/0066942 | A1 | * | 3/2006 | Kouno et al. ................ 359/368 |

FOREIGN PATENT DOCUMENTS

| | | |
|---|---|---|
| DE | 102 14 940 A1 | 10/2002 |
| JP | 08-114749 A | 5/1996 |
| JP | 2005-221560 A | 8/2005 |

OTHER PUBLICATIONS

Extended European Search Report dated Apr. 23, 2008, issued in a counterpart European Application.

* cited by examiner

*Primary Examiner*—Loha Ben
(74) *Attorney, Agent, or Firm*—Frishauf, Holtz, Goodman & Chick, P.C.

(57) ABSTRACT

A microscope lens barrel includes an input port where observation light enters the microscope lens barrel; a plurality of output ports which the observation light goes out of the microscope lens barrel; an optical-path switching mechanism which selectively switches an optical path of the observation light to guide the observation light from the input port to at least one of the output ports; and a supporting part which supports the optical-path switching mechanism. The input port, the output ports, and the supporting part are integrally formed as a tubular body frame so that the input port, the output ports, and the supporting part are arranged at respective center positions of sidewalls of the tubular body frame.

8 Claims, 6 Drawing Sheets

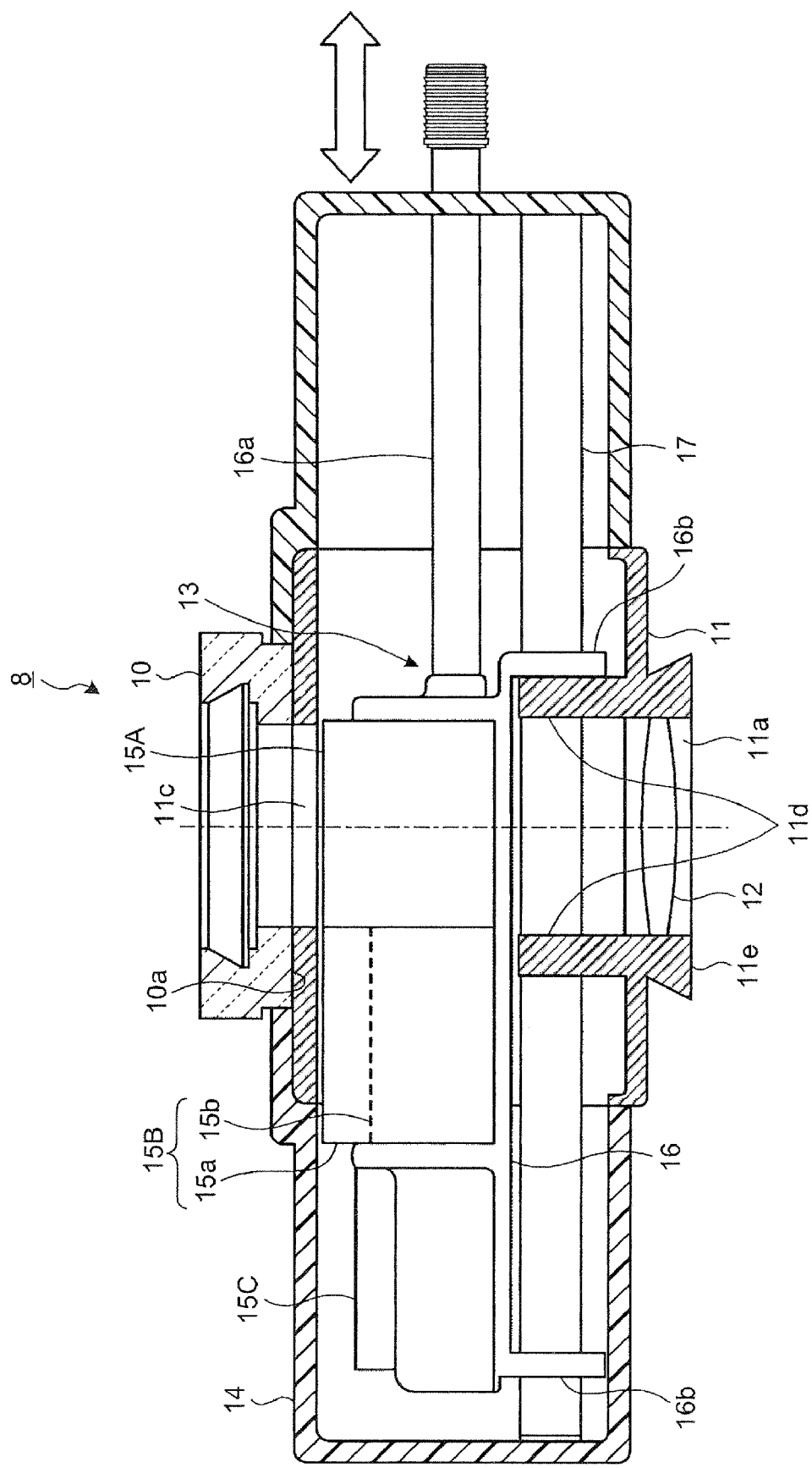

MICROSCOPE LENS BARREL

CROSS-REFERENCE TO RELATED APPLICATIONS

This application is based upon and claims the benefit of priority from Japanese Patent Application No. 2007-026755, filed on Feb. 6, 2007, the entire contents of which are incorporated herein by reference.

BACKGROUND OF THE INVENTION

1. Field of the Invention

The present invention relates to a microscope lens barrel including an input port where observation light enters the microscope lens barrel, a plurality of output ports where the observation light goes out of the microscope lens barrel, and an optical-path switching mechanism which selectively switches the optical path of the observation light to guide the observation light from the input port to at least one of the output ports.

2. Description of the Related Art

One conventional microscope lens barrel is a trinocular lens barrel switchable between visual and camera observation (see Japanese Patent Application Laid-Open No. H8-114749 and Japanese Patent Application Laid-Open No. 2005-221560). The main body of such a trinocular lens barrel, which is mounted on a microscope main body, generally includes an input port where observation light enters the lens barrel from an objective lens, an imaging lens which converges the entering observation light to form an observation image, a plurality of output ports where the observation light goes out to a binocular unit used for visual observation or a camera used for image observation, and an optical-path switching mechanism which selectively guides the observation light to at least one of the plurality of output ports. The binocular unit and the camera are attached to the lens barrel main body a neighboring parts of the corresponding output ports to be optically connected to the output ports, respectively. The imaging lens is provided in the input port or around the gate area of the input port.

On the other hand, a recent expansion in application of microscopes increases a demand for providing various measuring devices except for the camera on the trinocular lens barrel to observe a sample. Accordingly, there rises a necessity of mounting the measuring device heavier than the conventional camera on the lens barrel main body. In this case, larger load than ever is applied on the lens barrel main body, and thus greater strain is caused in the lens barrel main body and in optical elements provided therein. Therefore, there is a possibility of causing not only degradation in the quality of observation images but also a failure in obtaining desired observation accuracy. Moreover, since the load imposed on the microscope main body is accordingly increased, there is a possibility that the degradation in the image quality and the reduction in the observation accuracy are further aggravated.

SUMMARY OF THE INVENTION

A microscope lens barrel according to an aspect of the present invention includes an input port where observation light enters the microscope lens barrel; a plurality of output ports which the observation light goes out of the microscope lens barrel; an optical-path switching mechanism which selectively switches an optical path of the observation light to guide the observation light from the input port to at least one of the output ports; and a supporting part which supports the optical-path switching mechanism. The input port, the output ports, and the supporting part are integrally formed as a tubular body frame so that the input port, the output ports, and the supporting part are arranged at respective center positions of sidewalls of the tubular body frame.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2 and 3 show structures of the microscope lens barrel according to the embodiment;

DETAILED DESCRIPTION OF THE PREFERRED EMBODIMENTS

Exemplary embodiments of a microscope lens barrel according to the present invention will be explained in detail below with reference to the accompanying drawings. It should be noted that the present invention is not limited to the embodiments. The same parts are assigned with the same reference symbols throughout the drawings.

Figure 1:
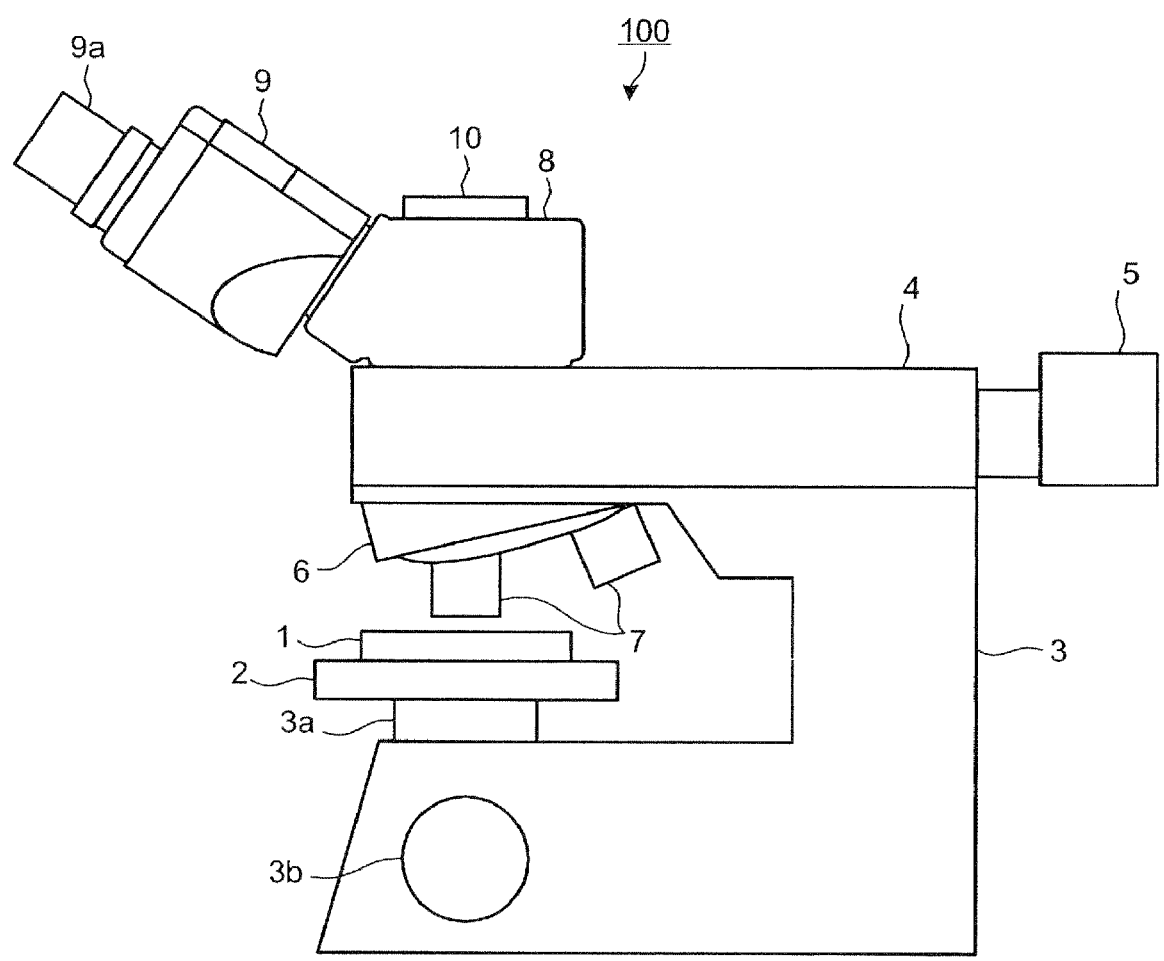
FIG. 1 shows a structure of a microscope using a microscope lens barrel according to an embodiment of the present invention.

A microscope lens barrel according to an embodiment of the present invention will be explained first. FIG. 1 shows a structure of a main part of a microscope 100 using the microscope lens barrel according to the present embodiment. As shown in FIG. 1, the microscope 100 includes a stage 2 on which a sample 1 is placed, a microscope main body 3 which supports the stage 2 by a stage holder 3a, an illumination and imaging unit 4 as an intermediate tube which is provided on an upper part of the microscope main body 3 and in which an illumination optical system (not shown) is provided, and a lamp house 5 which is attached at a rear end (right-side end in FIG. 1) of the illumination and imaging unit 4 and in which an illumination light source (not shown) is provided.

The microscope 100 further includes a revolver 6 provided at an edge part on a front side (left side in FIG. 1) of the microscope main body 3, a plurality of objective lenses 7 which are interchangeably attached to the revolver 6, and a lens barrel 8 mounted on an upper part of the illumination and imaging unit 4. A binocular unit 9 having a pair of eyepieces 9a is provided at a front surface (left-side surface in FIG. 1) of the lens barrel 8, and a device connecting part 10 to which a camera or a measuring device (not shown) is connected is provided on an upper surface of the lens barrel 8.

The sample 1 is moved up and down together with the stage 2 by the stage holder 3a which is moved up and down in accordance with a rotary movement of a focusing handle 3b which is provided to protrude from a side surface of the microscope main body 3. Thus, a focus adjustment of the sample 1 is performed with respect to the objective lenses 7. The sample 1 is freely moved on a plane surface perpendicular to an optical axis of the objective lenses 7 by a plane-surface driving mechanism (not shown). One of the objective lenses 7 is selectively arranged over the sample 1 in accordance with a rotary movement of the revolver 6. The illumination and imaging unit 4 uses the illumination optical system provided therein to irradiate the sample 1 with the illumination light supplied from the lamp house 5 via the selected objective lens 7.

The selected objective lens 7 works with the imaging lens 12 (see FIGS. 2 and 3) to be explained later which is contained in the lens barrel 8, to form an observation image of the sample 1 illuminated through the illumination optical system. On this occasion, the objective lens 7 converges the observation light emitted from each point on the sample 1 and generates a parallel light beam to emit the beam to the imaging lens 12. The imaging lens 12 converges the observation light emitted from the objective lens 7 to form the observation image. The observation image is guided from the lens barrel 8 to the binocular unit 9, split into two in the lateral direction (direction perpendicular to the sheet of FIG. 1), and then visually observed via the eyepieces 9a. Otherwise, the observation image is guided from the lens barrel 8 to the device connecting part 10 and detected by the camera or the measuring device (not shown).

Figure 2:
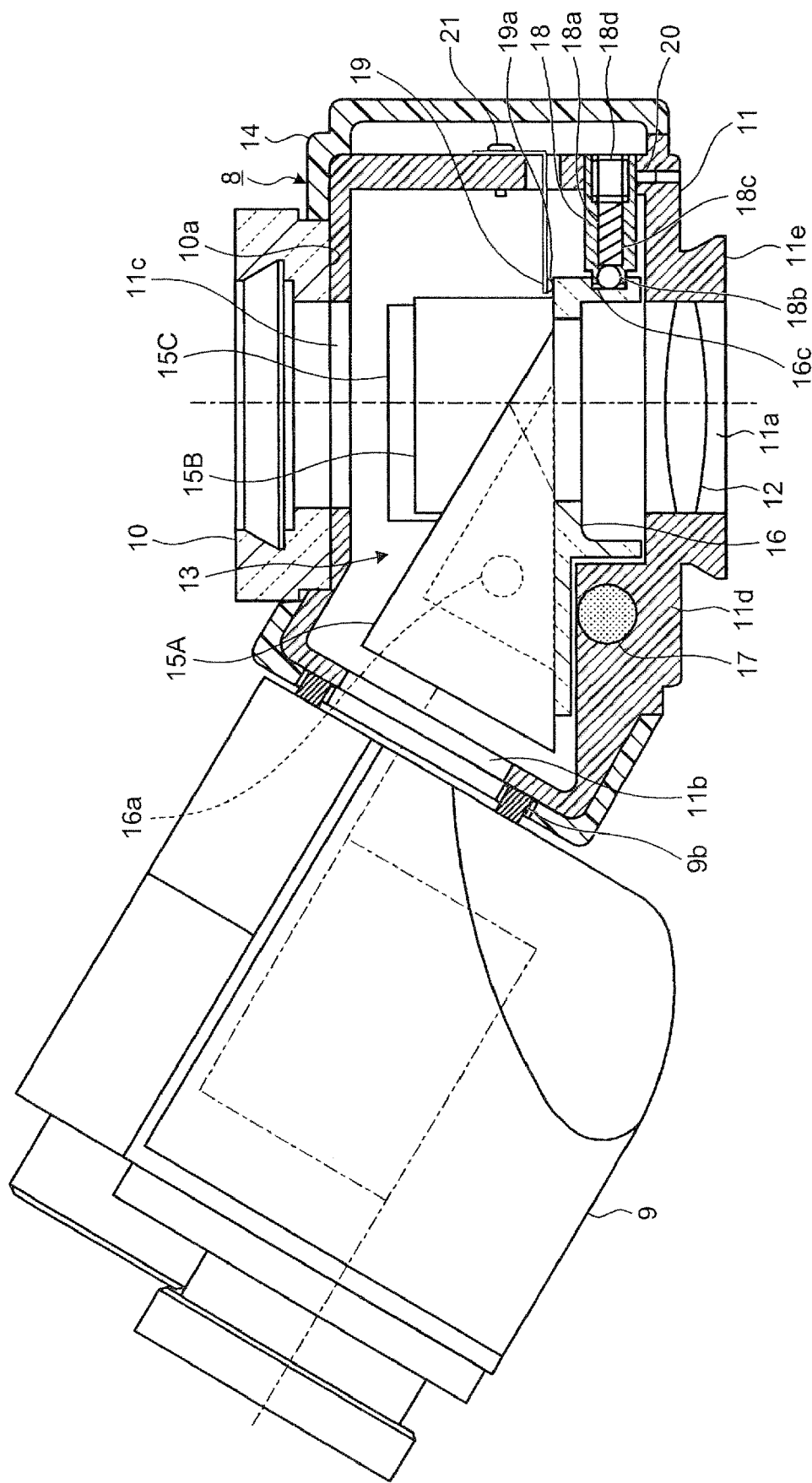

Next, the lens barrel 8 as the microscope lens barrel according to the present embodiment will be explained in detail. FIGS. 2 and 3 show structures of a main part of the lens barrel 8. FIG. 2 is a view seen from the right side, and FIG. 3 is a view seen from the front side (left side in FIG. 2), each showing an internal structure and a partially cross-sectional structure of the lens barrel 8. As shown in FIGS. 2 and 3, the lens barrel 8 includes a lens barrel main body 11, the imaging lens 12, an optical-path switching mechanism 13, and a cover 14.

The lens barrel main body 11 as a main body frame is a tubular integrally-formed frame body and opened in the lateral direction (direction perpendicular to the plane shown in FIG. 2 and lateral direction in FIG. 3). The lens barrel main body 11 includes, on the sidewalls, an input port 11a which holds the imaging lens 12 and where the observation light enters the lens barrel main body 11 from the objective lens 7 through the imaging lens 12; output ports 11b and 11c where the entering observation light go out respectively to the binocular unit 9, the camera, and the like (not shown); a supporting part 11d which supports the optical-path switching mechanism 13; and an attaching part 11e by which the lens barrel 8 is fixed at a predetermined position on the illumination and imaging unit 4.

The input port 11a, the output ports 11b and 11c, and the supporting part 11d are provided on respective sidewalls of the lens barrel main body 11 at a center position in the axial direction (direction perpendicular to the plane shown in FIG. 2) of the lens barrel main body 11, and arranged in the circumferential direction (direction along the periphery in the plane shown in FIG. 2) of the lens barrel main body 11. Specifically, the input port 11a, the supporting part 11d, the output port 11b, and the output port 11c are arranged in this order clockwise along the cross section at the center position of the lens barrel main body 11 as shown in FIG. 2. Here, the cross section at the center position of the lens barrel main body 11 means the plane perpendicular to the axis of the lens barrel main body 11, including an optical axis of the imaging lens 12.

The binocular unit 9 is attached and supported to the lens barrel main body 11 by directly contacting the circumference of the output port 11b at a distal end part 9b located at a side from which the observation light enters. The device connecting part 10 is attached and supported to the lens barrel main body 11 by directly contacting the circumference of the output port 11c at an end face 10a located at a side from which the observation light enters. The lens barrel 8 is attached to a predetermined position on the illumination and imaging unit 4 via the attaching part 11e which is provided to protrude in a round dovetail shape around the input port 11a. Thus, the objective lens 7, the lens barrel 8, and the binocular unit 9 or the device connecting part 10 are optically connected.

The optical-path switching mechanism 13 includes prisms 15A to 15C each as an optical element which forms an optical path for guiding, to the output ports 11b and 11c, the observation light incident via the input port 11a and the imaging lens 12; a slider 16 as a carrying unit which holds the prisms 15A to 15C, carries them in the axial direction of the lens barrel main body 11, and selectively allocates one of them with respect to the input port ha and the imaging lens 12; and a guide 17 as a guiding unit which supports the slider 16 and guides the slider 16 in the axial direction.

Figure 4A:
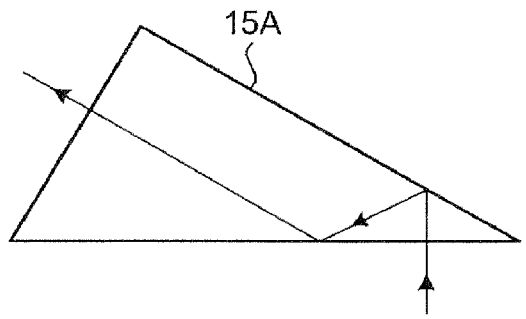
FIGS. 4A to 4C show prisms which form optical paths, respectively.
Figure 4B:
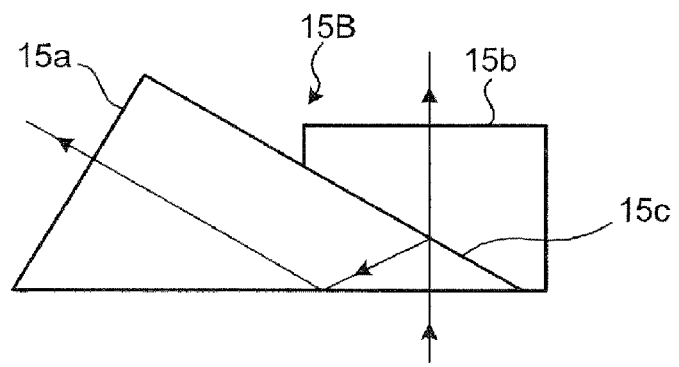
Figure 4C:
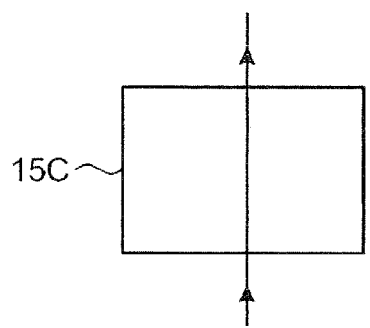

The prisms 15A to 15C are formed as shown in FIGS. 4A to 4C, respectively. Specifically, the prism 15A as a single-optical-path forming element internally reflects the observation light incident from the imaging lens 12 twice to emit the reflected observation light to the output port 11b. The prism 15B as a multiple-optical-paths forming element is formed by bonding a prism 15a and a prism 15b and splits the observation light incident from the imaging lens 12 into two on a bonded surface 15c. One of the split observation light beams is internally reflected twice in the prism 15a and emitted to the output port 11b, and the other observation light beam goes through the prism 15b and emitted to the output port 11c. The prism 15C as another single-optical-path forming element directly transmits the observation light incident from the imaging lens 12 and emits the observation light to the output port 11c. Here, the prism 15A and the prism 15a are formed in the same shape.

The slider 16 holds, on its top surface, the prisms 15A to 15C so that they are arranged in the axial direction of the lens barrel main body 11. The slider 16 is provided with a knob 16a protruding along the axial direction from the side surface of the slider 16, and with two connecting parts 16b protruding from the bottom of the slider 16. A guide 17 having a cylinder shape penetrates the two connecting parts 16b. The guide 17 also penetrates two supporting parts 11d provided in the axial direction, and is supported in parallel with the axial direction. Therefore, the optical-path switching mechanism 13 is supported by the supporting parts 11d, and the slider 16 can freely move in the axial direction of the lens barrel main body 11. The slider 16 selectively places one of the prisms 15A to 15C over the input port 11a and the imaging lens 12 when the knob 16a is operated to be pushed in and pulled out in the axial direction. Thus, the optical-path switching mechanism 13 selectively switches the optical path of the observation light guided from the input port 11a, and can guide the observation light to at least one of the output ports 11b and 11c.

The optical-path switching mechanism 13 is provided with a protruding guide 18 and a leaf spring 19 at its rear side (right side in FIG. 2). The protruding guide 18 includes a ball 18b, a spring 18c, and a screw 18d inside a penetration hole 18a formed in the protruding direction. A part of the ball 18b protrudes from a distal end portion of the penetration hole 18a under constant pressure, depending on a tightening of the screw 18d and a springing force of the spring 18c. The protruding guide 18 is provided to penetrate the sidewall of the lens barrel main body 11, and fixed by a setting screw 20. In this manner, the ball 18b directly contacts a groove 16c provided in the slider 16 under a predetermined pressure, and a head of the ball 18b is fitted in the groove 16c. Thus, the protruding guide 18 supports the slider 16 via the groove 16c, and prevents a rattling movement of the slider 16 in a direction perpendicular to the axis with respect to the guide 17.

The leaf spring 19 is provided with a protrusion 19a on a lower surface of one tip end, and fixed to the sidewall of the lens barrel main body 11 by a fixation screw 21. Thus, the protrusion 19a is fitted in a groove (not shown) formed in parallel with the axial direction on the upper surface of the slider 16. The groove fitted with the protrusion 19a has a plurality of small holes, depending on the arrangement of the prisms 15A to 15C. When the knob 16a is operated to be pushed in and pulled out in the axial direction, any one of the prisms 15A to 15C which corresponds to a small hole on the groove to which the protrusion 19a is fitted is positioned over the input port 11a and the imaging lens 12. Then, the protrusion 19a is easily put out of the small hole when the knob 16a is operated to be pushed in and pulled out with a stronger force. By using the upper part of the head of the protruding guide 18 as a stopper, the leaf spring 19 holds he slider 16 downward with the protrusion 19a. This configuration allows the slider 16 to slide along the axial direction in more stable condition.

Here, the length of the lens barrel main body 11 in the axial direction is designed based on a maximum diameter of the input port 11a, and the output ports 11b and 11c. Specifically, when the output port 11c has the maximum opening diameter for example, the lens barrel main body 11 is configured to have just enough length to secure, around the output port 11c, a space necessary for directly contacting the end face 10a and attaching the device connecting part 10 to the lens barrel main body 11. When the input port 11a has the maximum opening diameter for example, the lens barrel main body 11 is configured to have just enough length to secure, around the input port 11a, a space necessary for forming the attaching part 11e. This configuration allows setting the length of the lens barrel main body 11 to be slightly larger than the maximum opening diameter, and to be at least shorter than a movable range of the prisms 15A to 15C with the slider 16.

In the conventional microscope lens barrel, a guiding member corresponding to the guide 17 is supported by a supporting unit provided at both ends of a bottom part of the lens barrel main body frame. Therefore, the main body frame corresponding to the lens barrel main body 11 cannot be configured to have a length not more than the guiding member, and to have a length shorter than a movable range of optical elements corresponding to the prisms 15A to 15C. In contrast, the supporting parts 11d provided at right and left sides are provided at the center position in the axial direction of the lens barrel main body 11 in the lens barrel 8, and the length of the lens barrel main body 11 is configured to be shorter than the movable range of the prisms 15A to 15C with the slider 16.

With the shortened length of the lens barrel main body 11, the lens barrel main body 11 is thicker than the conventional main body frame in the lens barrel 8, and thereby the rigidity of the lens barrel main body 11 is improved. When the main body frame in the conventional microscope lens barrel is made thicker to improve the rigidity, the weight of the lens barrel increases by as much weight as the increased thickness arid the load on the microscope main body also increases. As a result, a greater strain is caused in the microscope main body and the degradation in the quality of observation images is aggravated. Hence, the conventional microscope lens barrel has difficulty in realizing a thicker main body frame.

On the other hand, since the length of the lens barrel main body 11 is made shorter than ever in the lens barrel 8, an increase in weight due to an increased thickness and an increase in load on the microscope main body 3 and the illumination and imaging unit 4 can be suppressed. Further, the weight of the lens barrel 8 can be reduced depending on framing conditions. In addition, a thicker lens barrel main body 11 allows improving the rigidity thereof. Therefore, even when the weight of the devices such as cameras and measuring devices to be mounted on the output port 11c is increased, the strain caused in the lens barrel main body 11, the imaging lens 12, the prisms 15A to 15C, and the like provided in the lens barrel main body 11 can be suppressed or reduced. Further, since the input port 11a, the output ports 11b and 11c, and the supporting part 11d are integrally formed as the lens barrel main body 11, the rigidity is improved more than the advantages as a result of the increased thickness. Furthermore, the integrally-formed lens barrel main body 11 allows reducing the man-hour in assembly, the number of parts, and the cost, compared with the structure of the lens barrel main body frame having two members as disclosed in Japanese Patent Application Laid-Open No. H8-114749, for example.

The cover 14 is detachably attached at both sides of the lens barrel main body 11, covering and protecting a part, of the optical-path switching mechanism 13, which protrudes from the lens barrel main body 11. The distal end portion of the knob 16a protrudes toward the outside through the cover 14, and can be operated to be pushed in and pulled out from the outside with the cover 14 attached. The cover 14 is formed with a lightweight material, being considered to have little influence on an increase in the weight of the lens barrel 8.

As described above, the lens barrel 8 corresponding to the microscope lens barrel according to the present embodiment includes the lens barrel main body 11 as a tubular frame body integrally formed by the input port 11a, the output ports 11b and 11c, and the supporting part 11d supporting the optical-path switching mechanism 13 so that these elements are arranged on the respective sidewalls of the frame body at the center position in the axial direction of the frame body. As a result, the length of the lens barrel main body 11 can be made shorter compared with the main body frame of the conventional microscope lens barrel, the thickness of the lens barrel main body 11 can be increased, and the rigidity of the lens barrel main body 11 can be improved while an increase in weight due to the increased thickness is suppressed. Thus, even when the weight of the device to be mounted on the lens barrel main body 11 is increased, the strain caused in the lens barrel main body 11 and the optical elements provided therein can be suppressed, and an increase in load on the microscope main body 3 and the illumination and imaging unit 4 can be suppressed.

Figure 5:
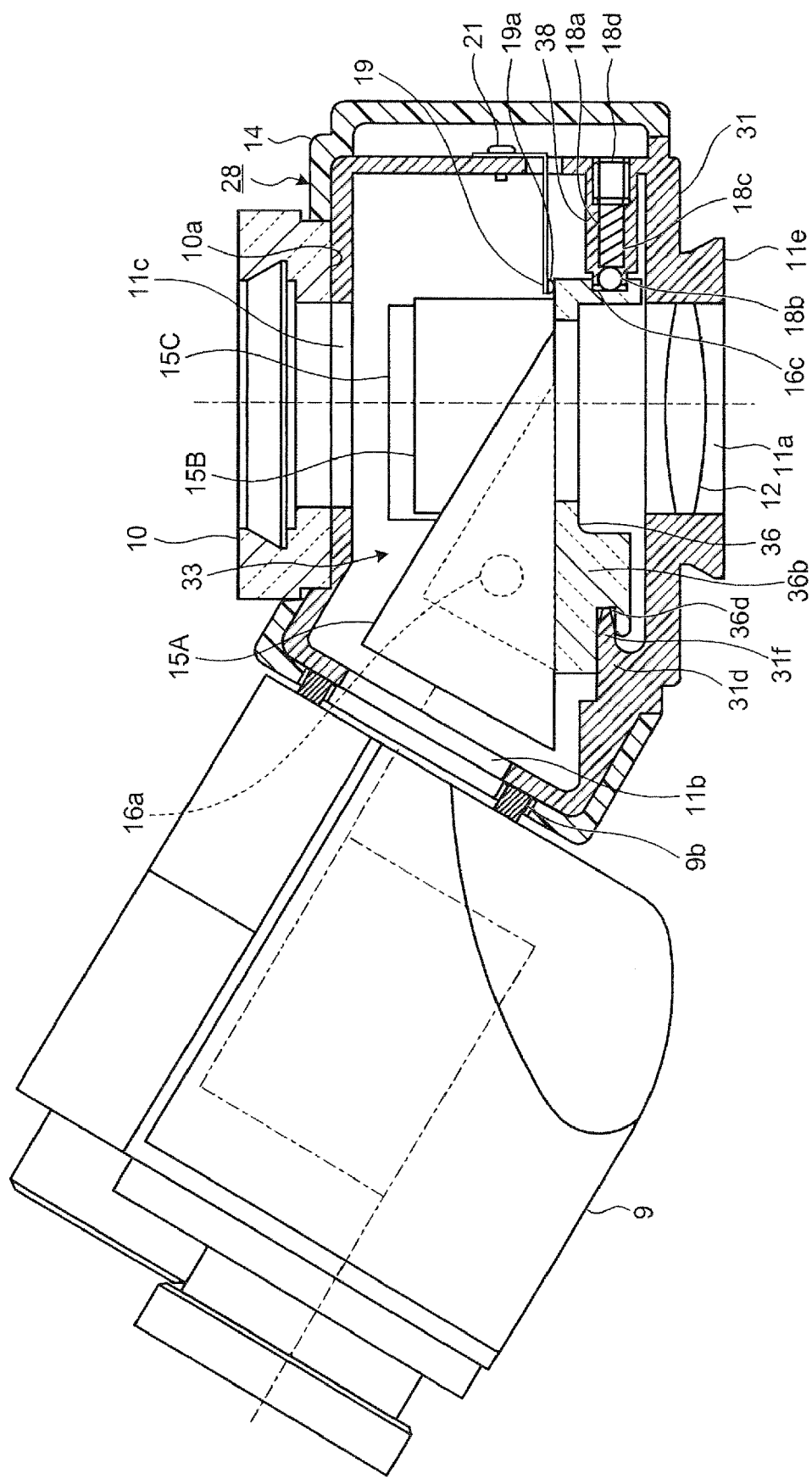
FIGS. 5 and 6 show structures of a microscope lens barrel according to a modification of the embodiment.
Figure 6:
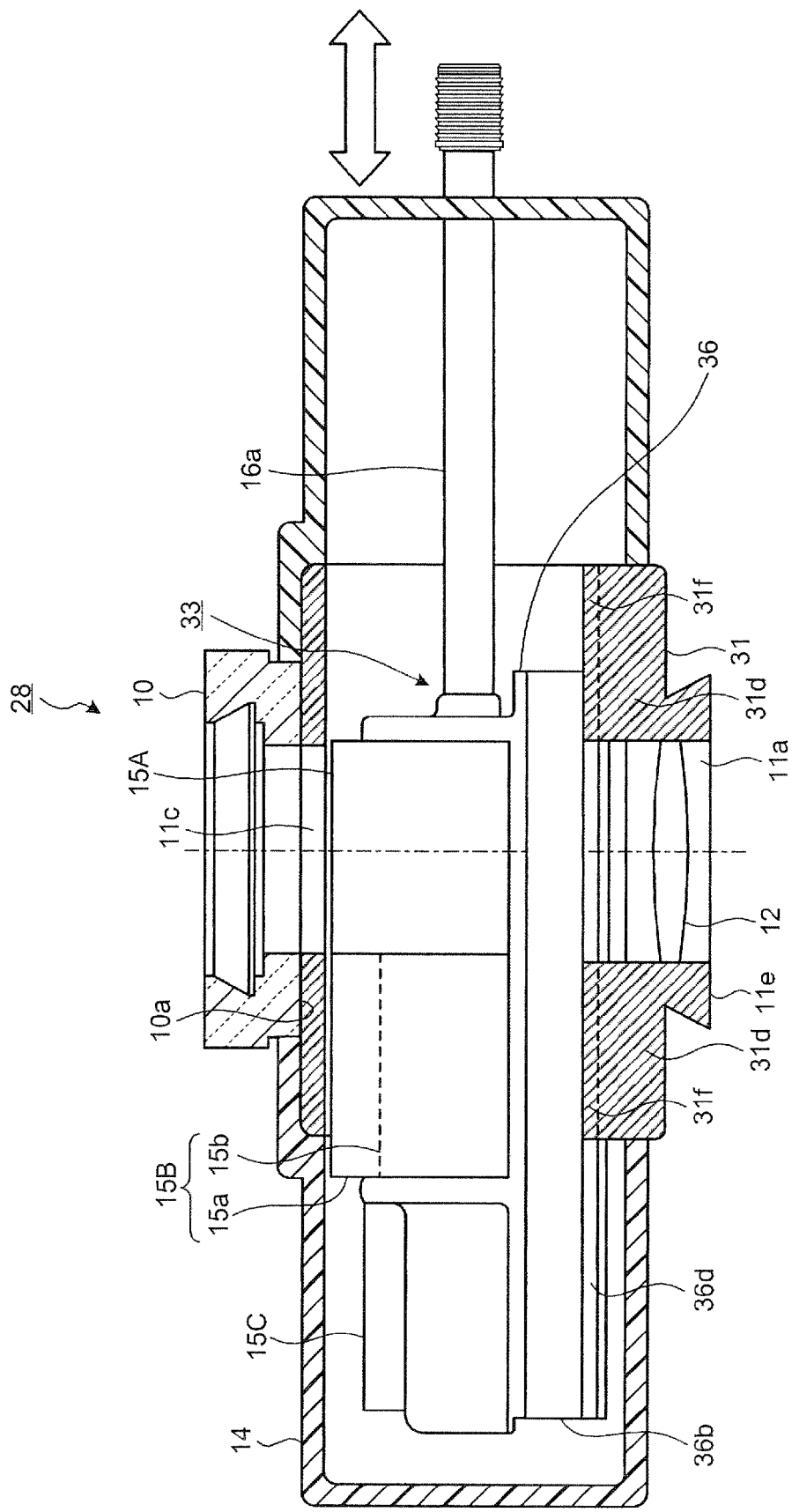

Next, a microscope lens barrel according to a modification of the embodiment will be explained. FIGS. 5 and 6 show structures of a main part of a lens barrel 28 as the microscope lens barrel according to the modification. FIG. 5 is a view seen from the right side, and FIG. 6 is a view seen from the front side (left side in FIG. 5), each showing an internal structure and a partially cross-sectional structure of the lens barrel 28. As shown in FIGS. 5 and 6, the lens barrel 28 includes a lens barrel main body 31 and an optical-path switching mechanism 33 respectively in place of the lens barrel main body 11 and the optical-path switching mechanism 13, based on the structure of the lens barrel 8. The other composition of the lens barrel 28 is the same as that of the lens barrel 8, and the same part is assigned with the same reference symbol. The lens barrel 28 in place of the lens barrel 8 is mounted on the microscope 100.

Based on the structure of the lens barrel main body 11, the lens barrel main body 31 includes a supporting part 31d which supports the optical-path switching mechanism 33 in place of the supporting part 11d which supports the optical-path switching mechanism 13, and further includes a protruding guide 38 in place of the protruding guide 18. The lens barrel main body 31 is integrally formed in a tubular frame body and open in the lateral direction. The input port 11a, output ports 11b and 11c, and the protruding guide 38 are arranged on the sidewall along the circumferential direction at the center position in the axial direction of the lens barrel main body 31.

Based on the structure of the optical-path switching mechanism 13, the optical-path switching mechanism 33 includes a slider 36 in place of the slider 16, and eliminates the guide 17. Based on the structure of the slider 16, the slider 36 includes a connecting part 36b which connects the supporting part 31d, in place of the connecting part 16b which connects the guide 17. The connecting part 36b has a groove 36d formed to be parallel with the knob 16a, and the supporting part 31d has a convex edge part 31f formed to be parallel with the axial direction of the lens barrel main body 31.

By inserting the convex edge part 31f into the groove 36d to touch internally with each other, the slider 36 is supported and guided to move freely in the axial direction by the supporting part 31d. As a result, the slider 36 selectively places one of the prisms 15A to 15C over the input port 11a and the imaging lens 12 when the knob 16a is operated to be pushed in and pulled out in the axial direction, similarly to the slider 16. Thus, the optical-path switching mechanism 33 selectively switches the optical path of the observation light guided from the input port 11a, and can guide the observation light to at least one of the output ports 11b and 11c, similarly to the optical-path switching mechanism 13.

The protruding guide 38 is formed to have a convex shape integrally with the lens barrel main body 31, and includes the ball 18b, the spring 18c, and the screw 18d in the penetration hole 18a formed inside the protruding guide 38, similarly to the protruding guide 18. In the protruding guide 38, the ball 18b is in direct contact with the groove 16c provided in the slider 36 under a predetermined pressure, and the head of the protruding guide 38 is fitted in the groove 16c. Thus, the protruding guide 38 supports the slider 36 via the groove 16c, and prevents a rattling movement of the slider 36 in a direction perpendicular to the axis with respect to the supporting parts 31d, similarly to the protruding guide 18.

As described above, the lens barrel 28 as the microscope lens barrel according to the modification is integrally formed in a tubular frame body similarly to the lens barrel main body 11, including the lens barrel main body 31 as the main body frame in which the input port 11a, the output ports 11b and 11c, and the supporting part 31d supporting the optical-path switching mechanism 33 are provided on the sidewall at the center position in the axial direction of the lens barrel main body 31. Therefore, the lens barrel 28 has the same advantages as the lens barrel 8. Furthermore, since the supporting part 31d is configured to support and guide and the slider 36, the number of parts and the man-hour in assembly can be reduced compared with the lens barrel 8.

Though exemplary embodiments of the present invention have been explained above, the present invention is not limited to those embodiments.

For example, though each of the lens barrel main bodies 11 and 31 is configured to include two output ports in the embodiments described above, the number of the opening is not limited to two and may he three or more. In this case, it is only necessary that the optical-path switching mechanism includes optical elements each of which forms an optical path of the observation light for each output port or a desired combination of output ports, and selectively places one of the optical elements with respect to the input port 11a and the imaging lens 12.

In the embodiments described above, each of the lens barrel main bodies 11 and 31 is configured to arrange the output ports 11b and 11c along the circumferential direction. However, the arrangement is not limited to the circumferential direction and the output ports 11b and 11c may be arranged in the axial direction. In this case, it is only necessary to determine the length of the lens barrel main body as a main body frame based on a length of the output ports arranged in the axial direction, i.e., a length from one end to the other end of a group of the output ports arranged in the axial direction.

In the embodiments described above, the optical-path switching mechanisms 13 and 33 are configured to switch the arrangement of the prisms 15A to 15C by shifting the slider 16 and 36 respectively in the axial direction. However, the mechanism is not limited to such a sliding switching mechanism, and may be a rotary switching mechanism using a turret and the like. In this case, when the supporting part which supports the rotary switching mechanism is arranged on the sidewall at the center position in the axial direction of the lens barrel main body, the same advantages as the embodiments described above can be obtained.

In the microscope lens barrel according to the present invention, even when the weight of devices to be mounted on the lens barrel main body is increased, the strain caused in the lens barrel main body and the optical elements provided therein can be suppressed, and an increase in load on the microscope main body can be suppressed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope lens barrel, comprising:
an input port where observation light enters the microscope lens barrel;
a plurality of output ports which the observation light goes out of the microscope lens barrel;
an optical-path switching mechanism which selectively switches an optical path of the observation light to guide the observation light from the input port to at least one of the output ports; and
a supporting part which supports the optical-path switching mechanism, wherein
the input port, the output ports, and the supporting part are integrally formed as a tubular body frame so that the input port, the output ports, and the supporting part are arranged at respective center positions of sidewalls of the tubular body frame.

2. The microscope lens barrel according to claim 1, wherein the input port, the output ports, and the supporting part are arranged along a circumferential direction of the tubular body fame.

3. The microscope lens barrel according to claim 1, wherein a length of the tubular body frame is designed based on maximum diameters of the input port and the output ports.

4. The microscope lens barrel according to claim 1, wherein
the optical-path switching mechanism includes
an optical element which forms the optical path of the observation light, and a carrying unit which carries the optical element in the axial direction of the tubular body frame so that the optical element is arranged with respect to the input port, and a length of the tubular body frame is shorter than a movable range of the optical element with the carrying unit.

5. The microscope lens barrel according to claim 1, wherein the optical-path switching mechanism includes an optical element which forms the optical path of the observation light, a carrying unit which carries the optical element in the axial direction of the tubular body frame so that the optical element is arranged with respect to the input port, and a guiding unit which guides the carrying unit, and the supporting part supports the guiding unit.

6. The microscope lens barrel according to claim 5, wherein the optical element includes a single-optical-path forming element which guides the observation light to a single output port of the output ports, and a multiple-optical-paths forming element which guides the observation light to the plurality of output ports, and the carrying unit selectively arranges one of the single-optical-path forming element and the multiple-optical-paths forming element with respect to the input port.

7. The microscope lens barrel according to claim 1, wherein the optical-path switching mechanism includes an optical element which forms the optical path of the observation light, and a carrying unit which carries the optical element in the axial direction of the tubular body frame so that the optical element is arranged with respect to the input port, and the supporting part supports and guides the carrying unit.

8. The microscope lens barrel according to claim 7, wherein the optical element includes a single-optical-path forming element which guides the observation light to a single output port of the output ports, and a multiple-optical-paths forming element which guides the observation light to the plurality of output ports, and the carrying unit selectively arranges one of the single-optical-path forming element and the multiple-optical-paths forming element with respect to the input port.

* * * * *